Figure 1:
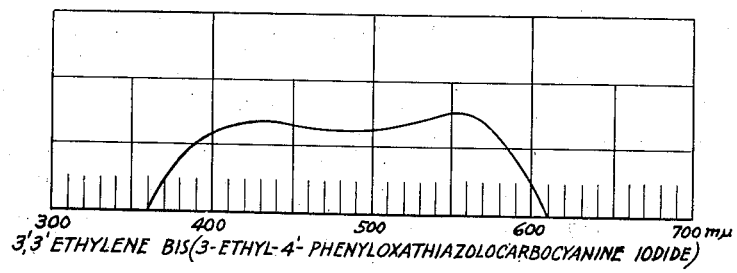

Feb. 8, 1949.

L. G. S. BROOKER 2,461,137

PHOTOGRAPHIC EMULSIONS SENSITIZED
WITH N, N-ALKYLENECYANINE DYES

Filed Sept. 4, 1946

3,3' ETHYLENE BIS(3-ETHYL-4'-PHENYLOXATHIAZOLOCARBOCYANINE IODIDE)

3,3' ETHYLENE BIS(3-ETHYL-4'-METHYLOXATHIAZOLOCARBOCYANINE IODIDE)

3,3' ETHYLENE BIS(3-ETHYL-5 METHYL-4'-PHENYLOXATHIAZOLOCARBOCYANINE IODIDE)

LESLIE G. S. BROOKER
INVENTOR

BY N. M. Perrins

Daniel J. Mayne

ATTORNEYS

UNITED STATES PATENT OFFICE 2,461,137

PHOTOGRAPHIC EMULSIONS SENSITIZED WITH N,N-ALKYLENECYANINE DYES

Leslie G. S. Brooker, Rochester, N. Y., assignor to Eastman Kodak Company, Rochester, N. Y., a corporation of New Jersey Application September 4, 1946, Serial No. 694,837

6 Claims. (Cl. 95—7)

This invention relates to N,N-alkylene cyanine dyes, to a process for preparing the same, and to photographic emulsions sensitized with such dyes.

Dyes of a type called N,N'-alkylene cyanine dyes are known and described in the copending application of Leslie G. S. Brooker and Robert H. Sprague, Serial No. 563,086, filed November 11, 1944. These known N,N'-alkylene cyanine dyes are characterized by containing an alkylene group linked to each of the nitrogen atoms of two heterocyclic nuclei which are also linked together through their alpha positions by a methine group as shown in the case of 3,3'-ethylenethiacyanine iodide:

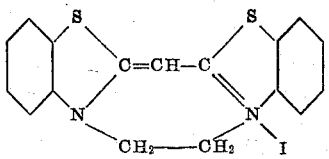

Contrasted with these known N,N'-alkylene cyanine dyes which are always monomethine dyes, my new dyes contain an alkylene group attached to each of the nitrogen atoms of two heterocyclic nuclei which are not linked together through their alpha positions. My new dyes can be monomethine or polymethine and I have called them N,N-alkylene cyanine dyes to contrast with the known N,N'-alkylene cyanine dyes. My new dyes are polymeric in nature and have at least two molecules (or units) of a cyanine dye salt linked together through a heterocyclic nitrogen atom terminal to the conjugated chain of atoms of each by a hydrocarbon radical, the terminal nitrogen atoms being attached to a carbon atom of said hydrocarbon radical which may be aliphatic or cycloaliphatic. An example of one of my new dyes is:

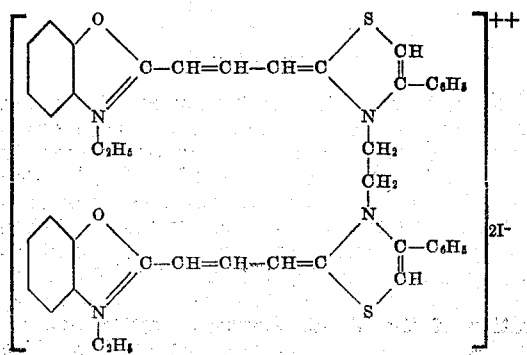

The formula of this dye can also be drawn showing the two iodide anions attached to the nitrogen atoms to which the ethylene group is attached or showing the two iodide anions attached to the nitrogen atoms of the two benzoxazole nuclei. For convenience of graphical representation the formulas used hereafter will be drawn to show the anions attached to the left-hand nuclei, i. e. the benzoxazole nuclei in the above example.

It is, accordingly, an object of my invention to provide new dyes. Another object is to provide a process for preparing such dyes. A still further object is to provide photographic emulsions sensitized with such dyes. Other objects will appear hereinafter.

The first group of new dyes of my invention can be represented by the following general formula:

I.
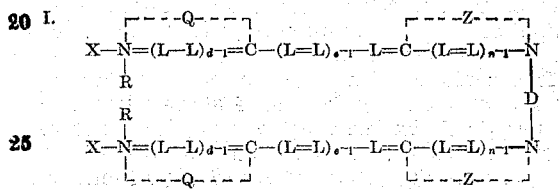

wherein $d$, $e$ and $n$ each represents a positive integer of from one to two, D represents an alkylene group, L represents a methine group, Q represents the non-metallic atoms necessary to complete a heterocyclic nucleus containing from 5 to 6 atoms in the heterocyclic ring, R represents a member selected from the group consisting of alkyl and aryl groups, X represents an anion and Z represents the non-metallic atoms necessary to complete a heterocyclic nucleus containing from 5 to 6 atoms in the heterocyclic ring.

More particularly in the above general formula D represents an alkylene group, e. g. a bivalent hydrocarbon radical, for instance ethylene, trimethylene, hexamethylene, 1,4-cyclohexylene, decamethylene, etc., L represents —CH=, —C(CH₃)=, etc., Q represents the nonmetallic atoms necessary to complete a nucleus of the thiazole series, e. g. 4-methylthiazole, 4-phenylthiazole, 4,5-diphenylthiazole, 4-(2-thienyl)thiazole, etc., a nucleus of the benzothiazole series, e. g. benzothiazole, 5-chlorobenzothiazole, 6-chlorobenzothiazole, 5-dimethylaminobenzothiazole, 6-methoxybenzothiazole, 6-methylbenzothiazole, 5-methylbenzothiazole, 5-bromobenzothiazole, 4-methoxybenzothiazole, 7-chlorobenzothiazole, etc., a nucleus of the naphthothiazole series, e. g. α-naphthothiazole, β-naphthothiazole, etc., a nucleus of the selenazole series, e. g. selenazole, 4-methylselenazole, 4-phenylselenazole, etc., a nucleus of the benzoselenazole series, e. g. benzoselenazole, 5-chlorobenzoselenazole, etc., a nucleus of the benzoxazole series, e. g. benzoxazole, 5-chlorobenzoxazole, 5-methoxybenzoxazole, 5-phenylbenzoxazole, etc., a nucleus of the 3,3-dialkylindolenine series, e. g. 3,3-dimethylindolenine, etc., a nucleus of the quinoline series, e. g. quinoline, 6-methylquinoline, 6-methoxyquinoline, 6-chloroquinoline, etc., R represents an alkyl group, i. e. an alcohol radical, e. g. methyl, ethyl, n-propyl, n-butyl, isobutyl, allyl, β-ethoxyethyl, β-hydroxyethyl, benzyl, β-phenylethyl, β-acetylethyl, β-acetoxyethyl, etc., or an aryl group, such as phenyl, X represents an anion, e. g. chloride, bromide, iodide, p-toluenesulfonate, benzenesulfonate, acetate, perchlorate, thiocyanate, etc., and Z represents the non-metallic atoms necessary to complete a nucleus of the thiazole series, e. g. 4-methylthiazole, 4-phenylthiazole, 4,5-diphenylthiazole, 4-(2-thienyl)thiazole, etc., a nucleus of the benzothiazole series, e. g. benzothiazole, 5-chlorobenzothiazole, 6-chlorobenzothiazole, 5-dimethylaminobenzothiazole, 6-methoxybenzothiazole, 6-methylbenzothiazole, 5-methylbenzothiazole, 5-bromobenzothiazole, 4-methoxybenzothiazole, 7-chlorobenzothiazole, etc., a nucleus of the naphthothiazole series, e. g. α-naphthothiazole, β-naphthothiazole, etc., a nucleus of the selenazole series, e. g. selenazole, 4-methylselenazole, 4-phenylselenazole, etc., a nucleus of the benzoselenazole series, e. g. benzoselenazole, 5-chlorobenzoselenazole, etc., a nucleus of the benzoxazole series, e. g. benzoxazole, 5-chlorobenzoxazole, 5-methoxybenzoxazole, 5-phenylbenzoxazole, etc., a nucleus of the 3,3-dialkylindolenine series, e. g. 3,3-dimethylindolenine, etc., a nucleus of the quinoline series, e. g. quinoline, 6-methylquinoline, 6-methoxyquinoline, 6-chloroquinoline, etc.

In accordance with my invention, I provide the dyes represented by formula I above wherein $e$ represents 1 by condensing a cyclammonium quaternary salt containing in the α or γ-positions, i. e. one of the so-called reactive positions, a member selected from the group consisting of halogen atoms of atomic weight greater than 35 and thioether groups, i. e. a cyclammonium quaternary salt selected from those represented by the following general formula:

II 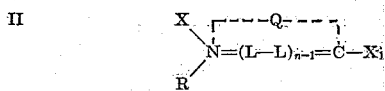

wherein $n$, Q, R and X have the values given above and $X_1$ represents a member selected from the group consisting of a halogen atom of atomic weight greater than 35 and a thioether group, with a bis cyclammonium quaternary salt selected from those which are represented by the following general formula:

III. 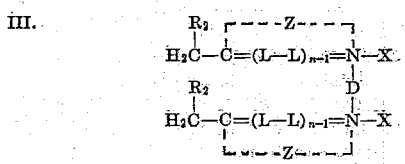

wherein D, $n$, X and Z have the values given above, and $R_2$ represents a hydrogen atom or an alkyl group. The preparation of these bis cyclammonium quaternary salts is described hereinafter.

Typical of the cyclammonium quaternary salts containing a halogen atom or a thioether group in a reactive position, i. e. the quaternary salts of formula II, are: 2-iodoquinoline methiodide, ethiodide, n-propiodide or n-butiodide, 2-iodoquinoline benziodide, 2-bromoquinoline propobromide, 4-chloroquinoline metho-p-toluene-sulfonate, 2-n-butylmercaptoquinoline ethiodide, 2-phenylmercaptoquinoline ethiodide, 2-β-naphthylmercaptoquinoline ethiodide, 2-p-chlorophenylmercaptoquinoline ethiodide, 2-methylmercaptobenzothiazole metho-p-toluenesulfonate, 2-ethylmercapto-5,6-dioxymethylene benzothiazole etho-p-toluenesulfonate, 2-methylmercaptobenzoxazole metho-p-toluenesulfonate, 4-phenylmercaptopyridine ethiodide, 4-phenylmercaptoquinoline ethiodide, 2-methylmercapto-β-naphthothiazole metho-p-toluenesulfonate, 2-methylmercapto-β-naphthoxazole metho-p-toluenesulfonate, etc.

The condensations are advantageously carried out in the presence of a basic condensing agent (acid-binding agent), e. g. a tertiary amine, especially a tertiary amine having an ionization constant greater than $10^{-5}$ at 25° C., e. g. trialkylamines (triisoamylamine, triethylamine, tri-n-propylamine, tri-n-butylamine, etc.), trihydroxyalkylamines (triethanolamine, tripropanolamine, etc.), N-alkylpiperidines (N-methylpiperidine, N-ethylpiperidine, etc.) and so forth. Alkali metal carbonates, e. g. sodium and potassium carbonates, are efficacious basic condensing agents. The condensations are advantageously carried out in a solvent, especially an alcohol, e. g. ethyl, n-propyl or n-butyl alcohol, i. e. an alcohol of the formula $C_nH_{2n+1}OH$ wherein $n$ represents a positive integer of from 1 to 4. Pyridine is likewise an efficacious solvent.

To prepare dyes of the above general formula I wherein $e$ represents one, I can also condense a cyclammonium quaternary salt containing in the α- or γ-position an alkyl group, i. e. a cyclammonium quaternary salt selected from those represented by the following general formula:

IV 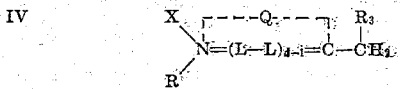

wherein $d$, L, Q, R and X have the values given above and $R_3$ represents a hydrogen atom or an alkyl group, with a bis alkylmercapto cyclammonium quaternary salt selected from those represented by the following general formula:

V. 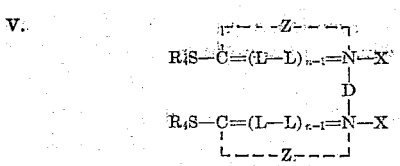

wherein D, L, $n$, X and Z represent the values given above and $R_4$ represents an alkyl group. Typical of the quaternary salts represented by formula IV are: quinaldine ethiodide, lepidine n-butiodide, 2-methylbenzothiazole metho-p-toluenesulfonate, 2-methylbenzoxazole ethiodide, 2-methyl-4-phenylthiazole ethiodide, 2-methylthiazoline methiodide, 2-methyl-β-naphthothiazole metho-p-toluenesulfonate, etc. The preparation of the bis alkylmercapto cyclammonium quaternary salts is described hereinafter. The condensations are advantageously carried out in the presence of a basic condensing agent and solvent of the character of those described above.

To prepare dyes of the above general formula I wherein $e$ represents two, I condense a cyclammonium quaternary salt containing in the $\alpha$- or $\gamma$-position a $\beta$-arylaminovinyl group, i. e. a cyclammonium quaternary salt selected from those represented by the following general formula:

VI. 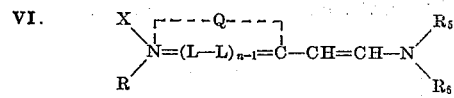

wherein $n$, Q, R and X have the values given above, and $R_5$ represents an aryl group, e. g. phenyl, p-chlorophenyl, p-tolyl or $\beta$-naphthyl and $R_6$ represents a hydrogen atom, an alkyl group, e. g. methyl, ethyl, etc. or an acyl group, e. g. acetyl, propionyl, butyryl, etc. with a bis cyclammonium quaternary salt selected from those represented by formula III above.

Typical of the quaternary salts set forth by formula VI are: 2-$\beta$-acetanilidovinylbenzoxazole ethiodide, 2-$\beta$-acetanilidovinylbenzothiazole ethiodide, 2-$\beta$-acetanilidovinylquinoline ethiodide, 4-$\beta$-acetanilidovinylquinoline n-butiodide, 2-$\beta$-acetanilidovinyl-$\beta$-naphthothiazole ethiodide, 2-$\beta$-anilinovinylthiazoline methiodide, 2-$\beta$-acetanilidovinylbenzothiazole pheniodide, 2-$\beta$-acetanilidovinylbenzoselenazole ethiodide, 2-$\beta$-acetanilidovinyl-4-methylthiazole methiodide, 2-$\beta$-acetanilidovinyl-4-phenylthiazole ethiodide, 2-$\beta$-acetanilidovinyl - 3,3 - dimethylindolenine methiodide, 2-[2-(N-methylanilino)vinyl] benzothiazole ethiodide, 2-($\beta$-acetanilidovinyl)-3,4-trimethylenebenzothiazolium iodide, etc.

The condensations to produce the bis trimethine dyes are advantageously carried out in the presence of a basic condensing agent (acid-binding agent), e. g. a tertiary amine, especially a tertiary amine having an ionization constant greater than $10^{-5}$ at 25° C. e. g. trialkylamines (triisoamylamine, triethylamine, tri-n-propylamine, tri-n-butylamine, etc.) trihydroxyalkylamines (triethanolamine, tripropanolamine, etc.), N-alkylpiperidines (N-methylpiperidine, N-ethylpiperidine, etc.) and so forth. The condensations are advantageously carried out in a solvent, especially an alcohol, e. g. ethyl, n-propyl or n-butyl alcohol, i. e. an alcohol of the formula $C_nH_{2n+1}OH$ wherein $n$ represents a positive integer of from 1 to 4. Pyridine is likewise an efficacious solvent and in some cases suffices as basic condensing agent.

To prepare dyes of the above general formula I wherein $e$ represents two, I also condense a cyclammonium quaternary salt containing in the $\alpha$- or $\gamma$-position, a $\beta$-alkylmercaptoalkenyl group, i. e. a cyclammonium quaternary salt selected from those represented by the following general formula:

VII 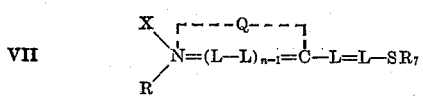

wherein L, $n$, Q, R and X have the values given above and $R_7$ represents an alkyl group, e. g. methyl, ethyl, n-butyl, etc. with a bis cyclammonium quaternary salt selected from those represented by formula III above.

Typical of the quaternary salts set forth by formula VII are: 2-(2-methylmercapto-1-butenyl)-benzothiazole metho-p-toluenesulfonate, 2-(2-methylmercaptopropenyl)-$\beta$-naphthothiazole metho-p-toluenesulfonate, 2-(2-methylmercaptopropenyl)-3,4-trimethylenebenzothiazolium - p - toluenesulfonate, 2-(2-methylmercaptopropenyl) benzothiazole etho-p-toluenesulfonate, 2-(2-methylmercapto-1-butenyl)benzothiazole pheno-p-toluenesulfonate, 5-chloro-2-(2-methylmercapto-1-butenyl)benzoselenazole metho-p-toluenesulfonate, 2-(2-methylmercaptostyryl)benzothiazole ethiodide, 2-(2-methylmercaptostyryl)-$\beta$-naphthothiazole ethiodide, 5-chloro-2-(2-methylmercaptopropenyl)benzothiazole ethiodide, 2-(2-methylmercaptopropenyl)quinoline etho-p-toluenesulfonate, 2-(2-methylmercapto-1-butenyl)quinoline metho-p-toluenesulfonate, 2-(2-methylmercaptopropenyl)-4-phenylthiazole etho-p-toluenesulfonate, 2-(1-methyl-2-methylmercapto-1-butenyl)benzothiazole metho-p-toluenesulfonate, 2-($\beta$-cyclopropyl-$\beta$-methylmercaptovinyl)-benzothiazole metho-p-toluenesulfonate, 2-($\beta$-cyclopropyl-$\beta$-methylmercaptovinyl)-$\beta$-naphthothiazole metho-p-toluenesulfonate, 5-chloro-2-($\beta$-cyclopropyl-$\beta$-methylmercaptovinyl) benzothiazole metho-p-toluenesulfonate, 2-($\beta$-cyclopropyl-$\beta$-methylmercaptovinyl)-benzoselenazole metho-p-toluenesulfonate, 2-($\beta$-cyclobutyl-$\beta$-methylmercaptovinyl)benzothiazole metho-p-toluenesulfonate, 2-($\beta$-cyclohexyl-$\beta$-methylmercaptovinyl)benzothiazole metho-p-toluenesulfonate, 3,3-dimethyl-2-($\beta$-methylmercaptovinyl)indolenine methomethylsulfate, etc. Many of the $\beta$-alkylmercaptoalkenyl compounds are known substances. Others are described in the copending applications of Grafton H. Keyes, Serial No. 597,149, filed June 1, 1945 (now U. S. Patent 2,429,469, issued October 21, 1947); 620,161, filed October 3, 1945 and 620,162, filed October 3, 1945.

The condensations (involving the 2-alkylmercaptoalkenyl cyclammonium quaternary salts) to give bis trimethine cyanine dyes are advantageously carried out in the presence of a basic condensing agent and solvent, e. g. the basic condensing agents and solvents set forth above under the condensations involving the $\beta$-arylaminovinyl cyclammonium quaternary salts.

The following examples will serve to illustrate further my new dyes and the manner of obtaining them.

*Example 1.*—*3,3-methylene bis (1'ethylthia-2'-cyanine iodide)*

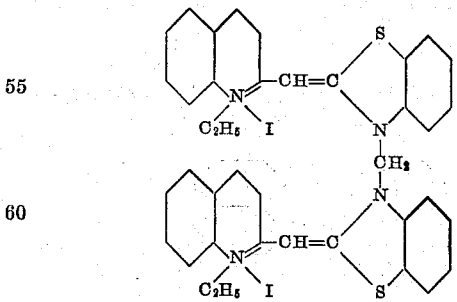

0.69 g. (1 mol.) of 3,3'-methylene bis(2-thiobenzothiazolone) and 0.74 g. (2 mols.) of methyl p-toluenesulfonate were heated together over a free flame until addition was complete. To the crude 3,3'-methylene bis(2-methylmercaptobenzothiazolium p-toluenesulfonate) were added 1.2 g. (2 mols.) of quinaldine ethiodide, ethyl alcohol and triethylamine and the reaction mixture was heated at the boiling point for a few minutes. The cool mixture was stirred with ether. The ether-alcohol layer was decanted and the residue was stirred with water. The solid was collected on a filter, transferred to a test tube, stirred with acetone and filtered. The yield of dye was 3 per cent after two recrystallizations from methyl alcohol. The brick red powder softened from 192° and decomposed at 202° C., and it sensitized a photographic gelatino-silver-bromiodide emulsion to about 550 mμ with maximum sensitivity at about 520 mμ.

*Example 2.—3,3-ethylene bis(1'-ethyl-4-phenyl-thiazolo-2'-cyanine iodide)*

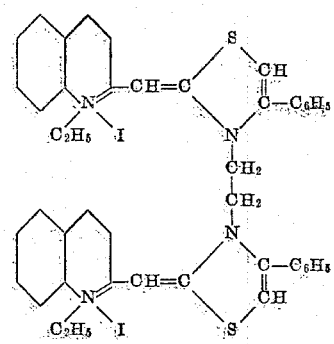

1.12 g. (1 mol.) of 3,3'-ethylene bis(2-methyl-4-phenylthiazolium chloride), 2.06 g. (2 mols.) of 2-iodoquinoline ethiodide, 10 cc. of absolute ethyl alcohol and 1.01 g. (4 mols.) of triethylamine were refluxed for 10 minutes. Upon chilling the reaction mixture, the dye separated as a sticky mass. The sticky mass was triturated first with ether then with acetone. The dye was filtered from the acetone, washed with water and dried. After recrystallization from methyl alcohol, the dye was obtained in 6 per cent yield as minute brown crystals having a green reflex and melting at 292 to 293° C. wtih decomposition. The dye sensitized a photographic gelatino-silver-bromiodide emulsion to about 570 mμ with maximum sensitivity at about 530 mμ.

In a similar manner, 2-methylbenzothiazole ethiodide can be condensed with 3,3'-methylene bis(2-methylmercaptobenzothiazolium p-toluenesulfonate) to give 3,3-methylene bis(3'-ethylthiacyanine iodide), or 2-methylbenzoxazole ethiodide can be condensed with the bis salt to give 3',3'-methylene bis(3-ethyloxathiacyanine iodide).

*Example 3.—1',1'-trimethylene bis(1-ethyl-2,4'-cyanine iodide)*

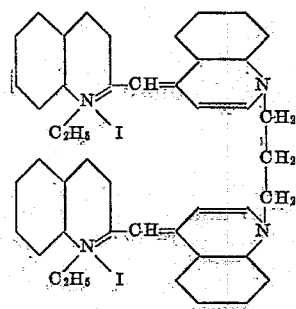

0.68 g. (4 mols.) of triethylamine was added to 1.38 g. (2 mols.) of 2-iodoquinoline ethiodide, 0.97 g. (1 mol.) of 1,1'-trimethylene bis(4-methylquinolinium iodide) and 10 cc. of ethyl alcohol, and the mixture was heated at the refluxing temperature for 10 minutes. After chilling at 0° C., the dye was collected on a filter and washed with ethyl alcohol and then water. The yield of dye was 65 per cent crude and 42 per cent after two recrystallizations from methyl alcohol (240 cc. per gram of dye). The minute dark crystals decomposed from 197° C., and they sensitized a photographic gelatino-silver-bromoiodide emulsion slightly with maximum sensitivity at about 530 mμ.

*Example 4.—3,3-trimethylene bis (1'-ethylthia-2'-cyanine iodide)*

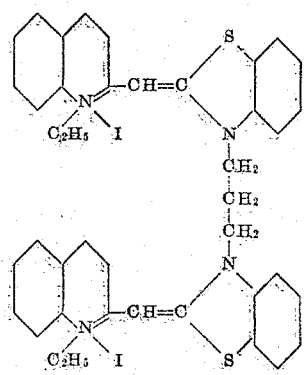

1.01 g. (4 mols.) of triethylamine was added to 2.06 g. (2 mols.) of 2-iodoquinoline ethiodide, 1.25 g. (1 mol.) of 3,3'-trimethylene bis (2-methylbenzothiazolium bromide) and 10 cc. of ethyl alcohol, and the reaction mixture was heated at the refluxing temperature for 15 minutes. After chilling at 0° C., the dye was collected on a filter and washed with methyl alcohol and then water. The yield of dye was 75 per cent crude and 25 per cent, in two crops, after one recrystallization from methyl alcohol. The red crystals had a melting point of 304–305° C. with decomposition, and they sensitized a photographic gelatino-silver-bromoiodide emulsion to about 560 mμ with maximum sensitivity at about 530 mμ.

*Example 5.— 3',3'- ethylene bis (3 - ethyl - 4'- phenyloxathiazolocarbocyanine iodide)*

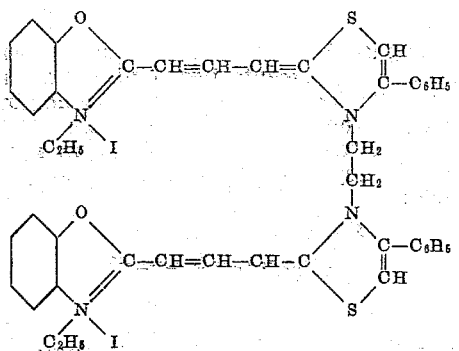

1.12 g. (1 mol.) of 3,3'-ethylene bis (2-methyl-4-phenyl-thiazolium chloride), 2.17 g. (2 mols.) of 2 - β - acetanilidovinyl-benzoxazole ethiodide, 10 cc. of ethyl alcohol and 0.5 g. (2 mols.) of triethylamine were refluxed for 15 minutes. Upon chilling the reaction mixture, the dye separated out. The dye was washed with water and purified by recrystallization from methyl alcohol. It was obtained in 4 per cent yield as a dark red crystalline powder melting at 288–289° C. with decomposition. The dye sensitized a photographic gelatino-silver-bromoiodide emulsion to about 610 mμ with maximum sensitivity at about 560 mμ.

*Example 6.—3',3'-ethylene bis (3-ethyl-4'-methyloxathiazolo-carbocyanine iodide)*

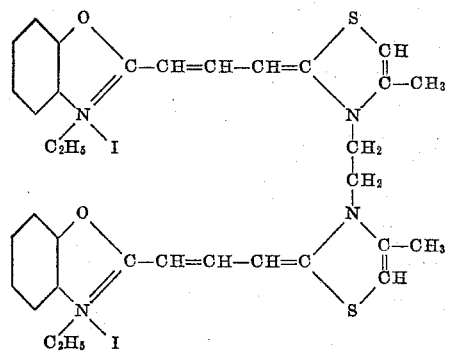

0.81 g. (1 mol.) of 3,3'-ethylene bis (2,4-dimethylthiazolium chloride), 2.17 g. (2 mols.) of 2-β-acetanilidovinyl-benzoxazole ethiodide, 10 cc. of absolute ethyl alcohol and 0.5 g. (2 mols.) of triethylamine were refluxed for 20 minutes. Upon chilling, the dye separated and was filtered off, washed with water, and purified by two recrystallizations from methyl alcohol (250 cc. per gram of dye). It was obtained in 9 per cent yield as a red powder, melting at 208 to 211° C. with decomposition. The dye sensitized a photographic gelatino-silver-bromiodide emulsion to about 590 mμ with maximum sensitivity at about 550 mμ.

*Example 7.—3',3'-ethylene bis (5-chloro-3-ethyl-4'-phenylthiathiazolocarbocyanine iodide)*

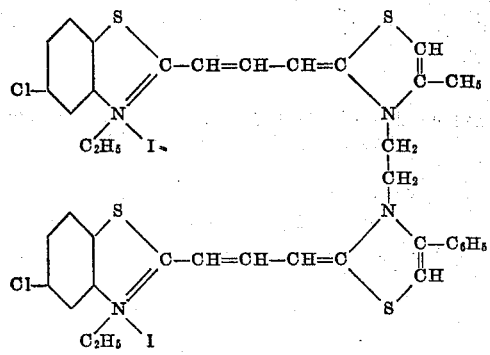

0.34 g. (2 mols.) of triethylamine was added to 1.61 g. (2 mols.) of 2-β-acetanilidovinyl-5-chlorobenzothiazole ethiodide, 0.74 g. (1 mol.) of 3,3'-ethylene bis (2-methyl-4-phenylthiazolium chloride) and 10 cc. of ethyl alcohol and the reaction mixture was heated at the refluxing temperature for 20 minutes. After chilling at 0° C., the crystals were collected on a filter and washed with methyl alcohol, then water and finally acetone. The mixture of dyes, which weighed 0.75 g., was extracted with two portions of hot methyl alcohol, 90 cc. and 350 cc. respectively. From the 350 cc. fraction there was obtained 0.28 g. of dye.

After another recrystallization, the yield of dye was 10 per cent. The dark green crystals had a melting point of 292–293° C. with decomposition, and they sensitized a photographic gelatino-silver-bromoiodide emulsion to about 650 mμ with maximum sensitivity at about 615 mμ.

In like manner, 3',3'-ethylene bis (3-ethyl-4'-phenyl-4,5-benzothiathiazolocarbocyanine iodide) was prepared by using 2.5 g. (2 mols.) of 2-β-acetanilidovinyl-β-naphthothiazole ethiodide in place of 2-β-acetanilidovinyl-5-chlorobenzothiazole ethiodide. The yield of dye was 6 per cent after the first series of extractions and 4 per cent after two more recrystallizations from methyl alcohol. The minute green crystals had a melting point of 254–255° C. with decomposition, and they sensitized a photographic gelatino-silver-bromoiodide emulsion to about 690 mμ with maxima sensitivity at about 580 mμ and 630 mμ.

In like manner, 3,3-ethylene bis (1'-n-butyl-4-phenylthiazolo-4'-carbocyanine perchlorate) was prepared by using 1.57 g. (2 mols.) of 4-β-acetanilidovinyl quinoline n-butiodide in place of 2-β-acetanilidovinyl-5-chlorobenzothiazole ethiodide, and then converting the dye to its perchlorate. The yield of dye was 2 per cent. The dull purplish powder sensitized a photographic gelatino-silver-bromoiodide emulsion from about 650 mμ to about 700 mμ with maximum sensitivity at about 680 mμ.

In like manner, 3',3'-ethylene bis (3-ethyl-4'-phenylthiathiazolocarbocyanine iodide) was obtained in a yield of 3 per cent. The minute greenish crystals had a melting point of 298–299° C. with decomposition, and they sensitized a photographic gelatino-silver-bromoiodide emulsion to about 660 mμ with maximum sensitivity at about 620 mμ.

*Example 8.—3',3'-ethylene bis (3-ethyl-5-methyl-4'-phenyloxathiazolocarbocyanine iodide)*

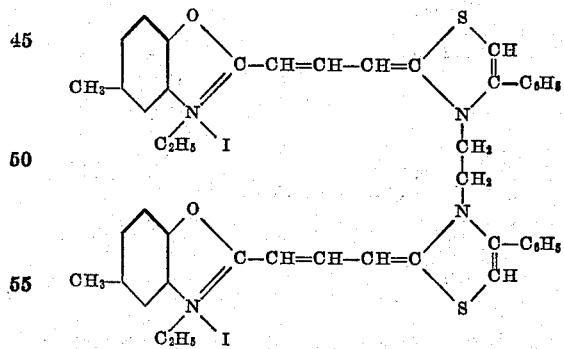

0.25 g. (2 mols.) of triethylamine was added to 1.12 g. (2 mols.) of 2-β-acetanilidovinyl-5-methylbenzoxazole ethiodide, 0.56 g. (1 mol.) of 3,3'-ethylene bis (2-methyl-4-phenylthiazolium chloride) and 10 cc. of absolute ethyl alcohol, and the reaction mixture was heated at the refluxing temperature for 20 minutes. After chilling at 0° C., the dye was collected on a filter and washed with acetone, then water and finally more acetone. The yield of dye was 18 per cent crude and 10 per cent after two recrystallizations from methyl alcohol. The small crystals had a melting point of 261–262° C. with decomposition, and they sensitized a photographic gelatino-silver-bromoiodide emulsion to about 620 mμ with maximum sensitivity at about 570 mμ.

Example 9.—3',3'-ethylene bis (3-ethyl-4',5-diphenyloxathiazolo-carbocyanine iodide)

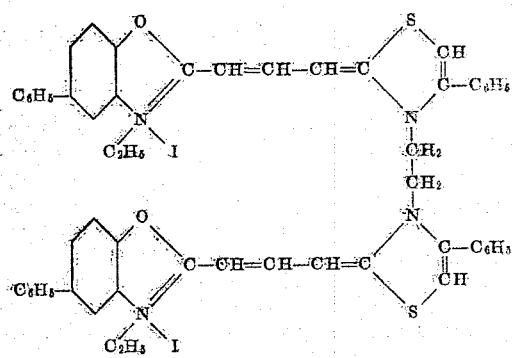

1.28 g. (2 mols.) of 2-β-acetanilidovinyl-5-phenylbenzoxazole ethiodide, 0.56 g. (1 mol.) of 3,3'-ethylene bis (2-methyl-4-phenylthiazolium chloride), 0.21 g. (2 mols.) of sodium acetate and 10 cc. of acetic anhydride were heated together at the refluxing temperature for 10 minutes. After chilling at 0° C., the dye was collected on a filter and washed with methyl alcohol. The yield of dye was 8 per cent crude and 4 per cent after one recrystallization from methyl alcohol. The green crystals with bronze reflex had a melting point of 314–315° C. with decomposition, and they sensitized a photographic gelatino-silver-bromoiodide emulsion to about 610 mμ with maximum sensitivity at about 570 mμ.

Example 10.—3',3'-trimethylene bis (3-ethyloxa-thiacarbocyanine iodide)

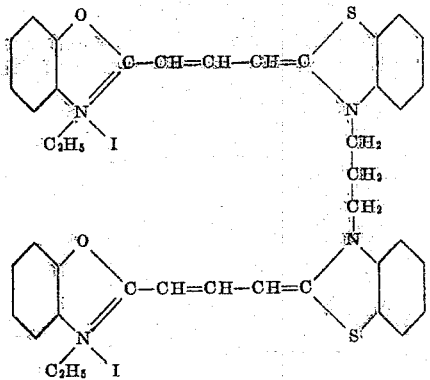

0.5 g. (2 mols.) of triethylamine was added to 2.17 g. (2 mols.) of 2-β-acetanilidovinylbenz-oxazole ethiodide, 1.25 g. (1 mol.) of 3,3'-trimethylene bis (2-methylbenzothiazolium bromide) and 10 cc. of ethyl alcohol, and the reaction mixture was heated at the refluxing temperature for 10 minutes. After chilling at 0° C., for two days, with some stirring, the solid was collected on a filter. The sticky residue was transferred to a beaker and stirred with water. The dye was collected on a filter and the finely divided solid was washed with water. The yield of dye was 43 per cent after two recrystallizations from methyl alcohol (160 cc. per gram of dye). The minute reddish crystals softened at 222° C. and decomposed at 225–227° C.; they sensitized a photographic gelatino-silver-bromoiodide emulsion to about 590 mμ with maximum sensitivity at about 555 mμ.

In like manner, 3,3-trimethylene bis(1'-n-butylthia-4'-carbocyanine iodide) was prepared by employing 2.36 g. (2 mols.) of 4-β-acetanilido-vinyl quinoline n-butiodide in place of 2-β-acetanilidovinylbenzoxazole ethiodide. The yield of dye was 27 per cent after two recrystallizations from methyl alcohol (280 cc. per gram of dye). The dark blue crystals had a melting point of 208–210° C. with decomposition, and they sensitized a photographic gelatino-silver-bromoiodide emulsion from about 600 mμ to about 690 mμ with maximum sensitivity at about 660 mμ.

Example 11.—3',3'-trimethylene bis(3-ethyl-4'-phenyloxathiazolo-carbocyanine iodide)

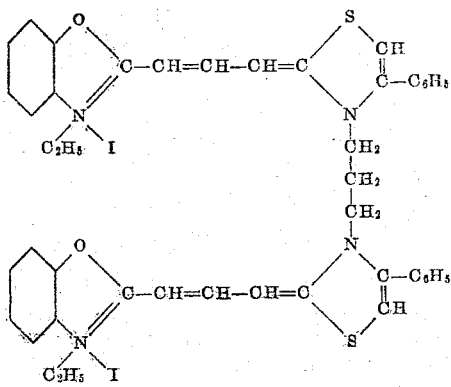

0.6 g. (2 mols.) of triethylamine was added to 2.58 g. (2 mols.) of 2-β-acetanilidovinylbenz-oxazole ethiodide, 1.7 g. (1 mol.) of 3,3'-trimethylene bis (2-methyl-4-phenylthiazolium bromide) and 10 cc. of ethyl alcohol, and the reaction mixture was heated at the refluxing temperature for 15 minutes. After chilling at 0° C., the dye was collected on a filter and washed well with water. The yield of dye was 5 per cent after two recrystallizations from methyl alcohol. The reddish crystals with green reflex had a melting point of 162–164° C. with decomposition, and they sensitized a photographic gelatino-silver-bromoiodide emulsion to about 610 mμ with maximum sensitivity at about 560 mμ.

Example 12.—3',3'-ethylene bis(5-chloro-3,9-di-ethylthiacarbocyanine iodide)

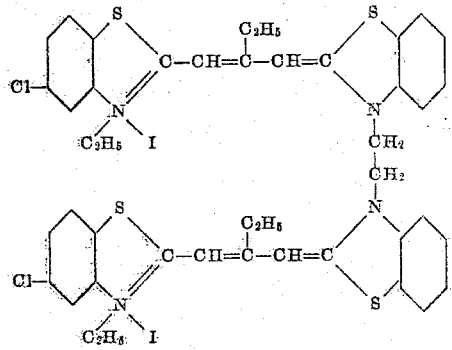

1.14 g. (2 mols.) of 5-chloro-3-ethyl-2-thio-propionylmethylenebenzothiazoline and 0.74 g. (2 mols.) of methyl p-toluenesulfonate were heated together at the temperature of the steam bath for one hour. To this crude 5-chloro-2-(2-meth-ylmercapto-1-butenyl)benzothiazole etho-p-toluenesulfonate were added 1.34 g. (1 mol.) of 3,3'- ethylene bis(2-methylbenzothiazolium p-toluene-sulfonate), 10 cc. of ethyl alcohol and 0.20 g. of triethylamine, and the reaction mixture was heated at the refluxing temperature for 20 minutes. The cool mixture was stirred with ether. After chilling at 0° C., the ether layer was decanted. The residue was dissolved in hot methyl alcohol and treated with a hot solution of sodium iodide (3 g.) in methyl alcohol. After chilling, the dye was collected on a filter and washed with methyl alcohol and then water. The yield of dye was 30 per cent crude and 6 per cent after three recrystallizations from methyl alcohol (300 cc. per gram of dye). The blue crystals had a melting point of 127–128° C. with decomposition, and they sensitized a photographic gelatino-silver-bromoiodide emulsion to about 630 m$\mu$ with maximum sensitivity at about 600 m$\mu$ and with a minium at about 500 m$\mu$.

The bis cyclammonium quaternary salts represented by Formula III above can be prepared by heating at least two molecular proportions of a heterocyclic nitrogen base containing in the $\alpha$- or $\gamma$-position an alkyl group selected from those having the following general formula:

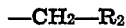

wherein $R_2$ represents a hydrogen atom or an alkyl group, with one molecular proportion of an alkylene salt selected from those represented by the following general formula:

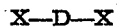

wherein D and X have the values set forth above. Typical alkylene salts are: ethylene di-p-toluenesulfonate, trimethylene dibromide, propylene diiodide, decamethylene dibromide, hexamethylene dibromide, tetramethylene dichloride, $\omega,\omega'$-xylene dibromide, diethyl-$\alpha,\beta$-ethane disulfate, methane disulfonic dimethyl ester, ethane disulfonic diethyl ester, 1,4-dibromocyclohexane, etc. The following examples will serve to illustrate further the preparation of bis cyclammonium quaternary salts by this method.

*Example 13.—3,3'-ethylene bis (2-methylbenzothiazolium-p-toluenesulfonate)*

2.98 g. (2 mols.) of 2-methylbenzothiazole and 3.7 g. (1 mol.) of ethylene di-p-toluenesulfonate were heated together in an oil bath at 105 to 115° C. for about 90 hours. After stirring the viscous mass with ether, the ethereal layer was decanted and the residue became crystalline as it was stirred with acetone. The yield of crystalline bis quaternary salt was 30 per cent. It melted at 152 to 155° C.

*Example 14.—1,1'-trimethylene bis(4-methylquinolinium iodide)*

2.15 g. (3 mols.) of lepidine and 1.01 g. (1 mol.) of trimethylene dibromide were heated together in an oil bath at 112 to 115° C. for 2 hours. After stirring the mixture with ether, the ethereal layer was decanted. The residue was dissolved in hot ethyl alcohol and to the hot solution was added a solution of sodium iodide in ethyl alcohol. The resulting mixture was chilled and the bis quaternary iodide collected on a filter.

*Example 15.—3,3'-trimethylene bis (2-methylbenzothiazolium bromide)*

14.9 g. (2 mols.) of 2-methylbenzothiazole and 10.1 g. (1 mol.) of trimethylene bromide were heated together in a sealed tube at 97 to 100° C. for one week. The tube was opened and the liquid portion of the reaction mixture was decanted. The solid was twice recrystallized from methyl alcohol. The bis quaternary salt thus obtained in 31 per cent yield had a melting point of 257 to 259° C. with decomposition.

*Example 16.—3,3'-trimethylene bis(2-methyl-4-phenylthiazolium bromide)*

17.5 g. (2 mols.) of 2-methyl-4-phenylthiazole and 10.1 g. (1 mol.) of trimethylene bromide were heated together in a sealed tube at 100° C. for one week. The tube was opened and unchanged starting materials were removed from the reaction mixture by extraction with ether. The undissolved bis quaternary salt was then washed with acetone. The washed bis quaternary salt weighed 1.7 g. and can be employed without further purification.

The 3,3'-alkylene bis(thiazolium salts) can also be prepared by condensing a N,N'-bis(thioacetyl)alkylenediamine with a halogenated ketone selected from those represented by the following general formula:

wherein $X_2$ represents a chlorine, bromine or iodine atom and $R_3$ represents a hydrocarbon radical, e. g. methyl, ethyl, phenyl, etc. The following examples will serve to illustrate further the manner of preparing bis quaternary salts by this method.

*Example 17.—3,3'-ethylene bis(2-methyl-4-phenylthiazolium chloride)*

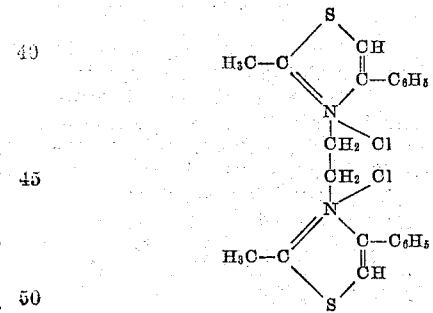

8.3 g. (1 mol.) of N,N'-bis(thioacetyl)ethylenediamine and 25.64 g. (3 mols.) of phenacyl chloride were heated together in an oil bath at 90–112° C. for 5 hours. The cooled reaction mixture was purified by washing with several (3 to 5) portions of acetone and then with ether. The resulting bis quaternary salt was a tan solid (54 per cent yield).

The N,N'-bis(thioacetyl)ethylenediamine employed above was prepared as follows: 23 g. (1 mol.) of N,N'-bis(acetyl)-ethylenediamine (Hofmann, Ber. 21, 2332) and 75 cc. of pyridine were heated together at 100–120° C. (oil bath). To the hot mixture were added 37 g. of phosphorus pentasulfide in small portions, with stirring, over a period of about 45 minutes. A vigorous reaction took place. After addition of the phosphorus pentasulfide, heating and stirring were continued for a further 10 minutes and then to the reaction mixture were added 100 cc. of hot water. The thioacetyl compound separated upon chilling the reaction mixture and was collected on a filter, washed with water and dried. It can be used without further purification.

Example 18.—3,3'-ethylene bis(2,4-dimethylthiazolium chloride)

8.8 g. (1 mol.) of N,N'-bis(thioacetyl)ethylenediamine and 9.25 g. (2 mols.) of chloroacetone were placed together in a flask, fitted with a long air condenser and heated in an oil bath at 90° C. A vigorous reaction took place. The reaction flask was removed from the oil bath until the reaction subsided and was then heated a further 30 minutes at 90 to 100° C. The cooled reaction mixture was triturated with acetone, collected on a filter and dried. This crude bis quaternary salt was extracted with hot ethyl alcohol (350 cc.) to remove by-products. The residue from the extraction was recrystallized from methyl alcohol, using "Norite" (activated charcoal) to decolorize the methyl alcohol solution. The bis quaternary salt was obtained as colorless crystals, melting about 300° C.

The bis alkylmercapto cyclammonium quaternary salts represented by Formula V above can be prepared by heating at least two molecular proportions of a heterocyclic nitrogen base containing in the α- or γ-position an alkylmercapto group, with one molecular proportion of an alkylene salt selected from those represented by the following formula:

X—D—X wherein D and X have the values given above. Typical alkylene salts are set forth above. Typical heterocyclic nitrogen bases containing an alkylmercapto group include: 2-methylmercaptoquinoline, 2-methylmercaptobenzoxazole, 2-methylmercapto-β-naphthoxazole, 4-methylmercaptoquinoline, 2-methylmercaptobenzothiazole, etc.

In preparing bis alkylmercapto quaternary salts represented by Formula V wherein D represents a methylene group, I have found it advantageous to add an alkyl salt to a dithione. Such a method of preparation is further illustrated in Example 1 wherein 3,3'-methylene bis(2-methylmercaptobenzothiazolium-p-toluenesulfonate) is prepared by adding methyl p-toluenesulfonate to 3,3'-methylene bis(2-thiobenzothiazolone). The preparation of the bis(2-thiobenzothiazolone) is shown in the following example.

Example 19.—3,3'-methylene bis(2-thiobenzothiazolone)

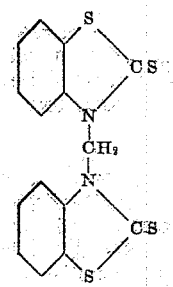

12.75 g. of di(2-benzothiazolylmercapto)methane and a crystal of iodine were heated together in an oil bath at 200–220° C. for two hours and 220–240° C. for one hour. The cool mixture was stirred with methyl alcohol and the alcoholic layer was decanted. The residue was stirred with acetone, filtered and washed, the product with acetone. The yield of intermediate was 51 per cent crude and 41 per cent after one recrystallization from pyridine (20 cc. per gram of intermediate). The tan crystals had a melting point of 291–293° C. The di(2-benzothiazolylmercapto)methane:

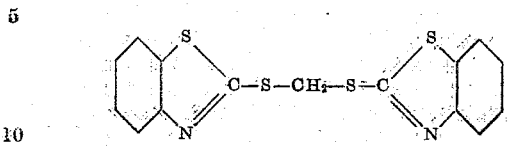

was prepared as follows: 8.35 g. (2 mols.) of 2-mercaptobenzothiazole, 4.35 g. (1 mol.) of methylene bromide and a solution of 3.3 g. (2 mols.) of 85 per cent potassium hydroxide in 50 cc. of ethyl alcohol were heated together at the refluxing temperature for one hour. After chilling overnight, the solid was collected on a filter and washed with ethyl alcohol and then with water. The yield of intermediate was 81 per cent crude and 69 per cent after one recrystallization from methyl alcohol (50 cc. per gram of intermediate). The almost colorless crystals had a melting point of 90–91° C.

I have also found that bis quaternary salts represented by Formula III above can be condensed with p-dialkylaminobenzaldehydes and p-dialkylaminocinnamaldehydes to give bis styryl type dyes. The condensations are advantageously carried out in the presence of a secondary amine having an ionization constant at 25° C. greater than $10^{-5}$, e. g. piperidine, 2-methylpiperidine, etc. The following example will serve to illustrate further the manner of obtaining such bis dyes.

Example 20.—3,3'-ethylene bis[2-(p-dimethylaminostyryl)-4-phenylthiazolium iodide]

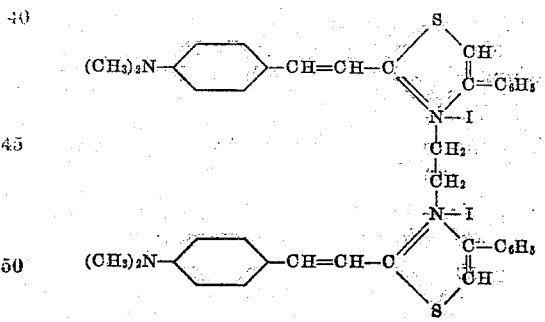

1.12 g. (1 mol.) of 3,3'-ethylene bis (2-methyl-4-phenylthiazolium chloride), 0.75 g. (2 mols.) of p-dimethylaminobenzaldehyde, 10 cc. of absolute ethyl alcohol and 3 drops of piperidine were refluxed for 4 hours. To the hot reaction mixture was added an ethyl alcoholic solution of 3 g. of sodium iodide. The styryl iodide, which separated upon cooling, was filtered off, washed with water and twice recrystallized from methyl alcohol (180 cc. per gram of dye). It was obtained in 7 per cent yield as brown prisms having a green reflex and melting at 281° C. with decomposition. It sensitized a photographic gelatino-silver-bromiodide emulsion to about 630 mμ with maximum sensitivity at about 595 mμ.

In a similar manner, p-diethylaminobenzaldehyde, p-dimethylaminocinnamaldehyde, p-diethylaminocinnamaldehyde, etc. can be condensed with 3,3'-ethylene bis (2-methyl-4-phenylthiazolium chloride) or any of the bis quaternary salts of Formula III.

These new bis styryl type dyes obtained in accordance with my invention can be represented by the following general formula:

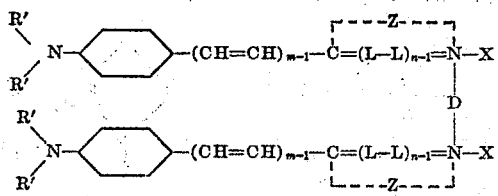

wherein D, L, n, X and Z have the values given above, m represents a positive integer of from 1 to 2, and R' represents an alkyl group.

I have also found that bis quaternary salts represented by Formula III above can be condensed with orthoesters to give polymeric carbocyanine dyes. The condensations are advantageously but not necessarily carried out in the presence of an acid-binding agent, e. g. pyridine, triethylamine, etc. Acetic anhydride or ethyl alcohol can be employed as a reaction medium. The following example will serve to illustrate further the manner of obtaining such polymeric dyes.

*Example 21.—Polymeric 3,3'-trimethylenethiacarbocyanine bromide*

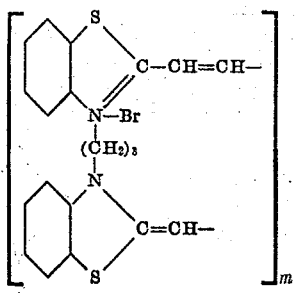

2.5 g. (2 mols.) 3,3'-trimethylene bis(2-methylbenzothiazolium bromide), 2.2 g. (6 mols.) of triethylorthoformate and 20 cc. of acetic anhydride were refluxed for 20 minutes. The mixture was then cooled and stirred. The dye was filtered off and washed on the filter first with acetone, then with water and again with acetone. The washed dye weighed 1.5 g. The dye was extracted with 300 cc. of methyl alcohol. The 300 cc. methyl alcoholic extract was concentrated to about 50 cc. The dye which separated from the concentrated extract was filtered off. The dye was recrystallized from methyl alcohol (180 cc. per gram of dye) and obtained as dark green crystals, melting at 233–240° C. with decomposition. The dye sensitized a gelatino-silver-bromiodide emulsion to 630 m$\mu$ with a maximum at 590 m$\mu$.

In a similar manner, 3,3'-trimethylene bis (2-methylbenzothiazolium bromide) can be condensed with triethyl orthoacetate, triethyl orthopropionate, triethyl orthobenzoate, triethyl orthophenylacetate, etc. to give polymeric carbocyanine dyes.

These polymeric carbocyanine dyes obtainable by my new process can be represented by the following general formula:

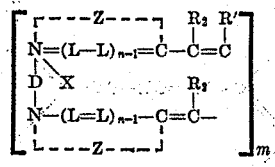

wherein D, n, R$_2$, X and Z have the values given above, R' represents an alkyl, aralkyl or aryl group, and m represents a positive integer, e. g. 2, 3, 4, etc.

Instead of employing orthoesters, the bis quaternary salts of Formula III can be condensed with diphenylformamidine to give polymeric carbocyanine dyes, with anilinoacrolein anil hydrochloride to give polymeric dicarbocyanine dyes and with glutaconic aldehyde dianilide hydrochloride to give polymeric tricarbocyanine dyes. Acid-binding agents, such as triethylamine, piperidine, are advantageously employed in these condensations.

To prepare photographic emulsions sensitized with my new dyes, it is only necessary to disperse the dyes in the emulsions. It is convenient to add the dyes to the emulsions from solutions in appropriate solvents. Methyl alcohol has proven satisfactory for this purpose. Ethyl alcohol can also be used. Sensitization by means of these dyes is, of course, directed primarily to the ordinarily employed gelatino-silver-halide developing-out emulsions. The dyes (one or more) are ordinarily incorporated in the washed, finished emulsions and should, of course, be uniformly distributed throughout the emulsion. The concentration of the dyes in the emulsions can vary widely, i. e. from about 5 to about 100 mg. per liter of flowable emulsion. The concentration of the dye will vary according to the type of light-sensitive material in the emulsion and according to the effect desired. The suitable and most economical concentration for any given emulsion will be apparent to those skilled in the art of emulsion making. To prepare a gelatino-silver-halide emulsion sensitized with one more of these dyes, the following procedure is satisfactory. A quantity of the dye is dissolved in methyl alcohol or other suitable solvent, and a volume of this solution (which may be diluted with water) containing from 5 to 100 mg. of dye is slowly added to 1000 cc. of gelatino-silver-halide emulsion, with stirring. Stirring is continued until the dye is uniformly distributed throughout the emulsion. With most of these sensitizing dyes, 10 to 20 mg. of dye per liter of emulsion suffices to produce the maximum sensitizing effect with the ordinary gelatino-silver-bromide (including bromiodide) emulsions. With gelatino-silver-chloride emulsions somewhat larger concentrations may be required to produce the optimum sensitizing effect. The above statements are only illustrative and are not to be understood as limiting my invention, as it will be apparent that these dyes can be incorporated by other methods in photographic silver halide emulsions customarily employed in the art. For instance, the dyes may be incorporated by bathing a plate or film upon which an emulsion has been coated in a solution of the dye in an appropriate solvent. Bathing methods, however, are not to be preferred ordinarily.

Figure 2:
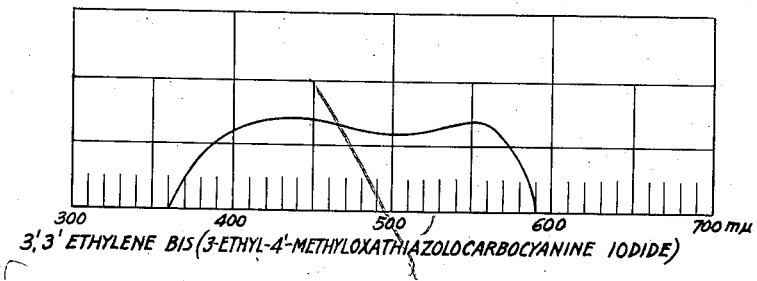
Figure 3:
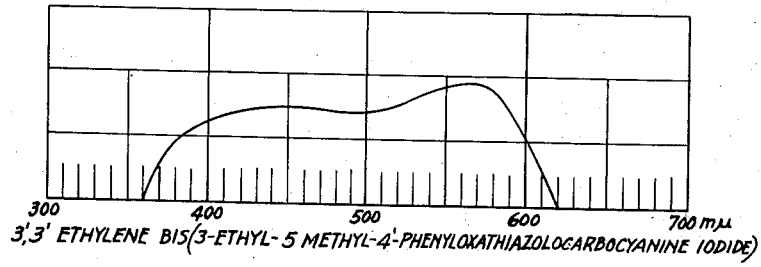

The accompanying drawing further illustrates my invention. Each figure is a diagrammatic reproduction of a spectrogram showing the sensitivity of a gelatino-silver-bromoiodide emulsion containing one of my new N,N-alkylenecyanine sensitizing dyes. In Fig. 1, the curve depicts the sensitivity of an ordinary gelatino-silver-bromoiodide emulsion containing 3',3'-ethylene bis(3-ethyl-4'-phenyloxathiazolocarbocyanine iodide). In Fig. 2, the curve depicts the sensitivity of an ordinary gelatino-silver-bromoiodide emulsion containing 3',3'-ethylene bis(3-ethyl-4'-methyloxathiazolocarbocyanine iodide). In Fig. 3, the curve depicts the sensitivity of an ordinary gelatino-silver-bromoiodide emulsion containing 3',3'- ethylene bis(3-ethyl-5-methyl-4'-phenyloxathiazolocarbocyanine iodide).

My new dyes are of lower solubility and diffusibility in photographic silver halide emulsions than many of the known sensitizing dyes and are especially valuable, therefore, in sensitizing photographic emulsions employed in color photographic elements where (relative) non-diffusibility of the sensitizing dyes is required for good color-separation. In some color processes, too, substances are present in the emulsions that tend to dissolve the sensitizing dyes from the silver halide grains. Low solubility of these dyes minimizes this tendency. Typical color photographic processes and typical color photographic elements comprising two or more differentially sensitized photographic silver halide emulsions are described in United States Patent 2,113,329, dated April 5, 1938, in British Patents 500,611 and 500,862 each accepted February 10, 1939, in United States Patent 1,985,344, dated December 25, 1934, in United States Patent 1,956,112, dated April 12, 1934 and in United States Patent 1,517,049, dated November 25, 1924, for example. Another case where my new dyes are especially useful is in the sensitization of variable contrast materials such as described in United States Patent 2,348,598, dated September 11, 1945, United States Patent 2,358,169, dated September 12, 1944, and in United States Patent 2,358,060, dated September 12, 1944.

My new polymeric dyes are adsorbed on the silver halide grains of the photographic silver halide emulsions when incorporated in the emulsions.

Emulsions sensitized with my new dyes can be coated on the usual supports of paper, cellulose acetate film, glass, polyvinyl acetal resin film, metal, etc. in the usual manner.

What I claim as my invention and desire to be secured by Letters Patent of the United States is:

1. A photographic silver halide emulsion sensitized with at least one sensitizing bis carbocyanine dye selected from those which are represented by the following general formula:

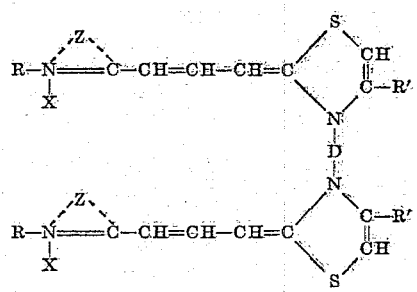

wherein R represents a primary alkyl group of the formula $C_nH_{2n+1}$ wherein $n$ represents a positive integer of from 1 to 4, R' represents a member selected from the group consisting of the methyl group and the phenyl group, X represents an anion, D represents a member selected from the group consisting of the ethylene, the trimethylene and the tetramethylene groups, and Z represents the non-metallic atoms necessary to complete a heterocyclic nucleus of the benzoxazole series.

2. A photographic gelatino-silver-halide emulsion sensitized with at least one sensitizing bis carbocyanine dye selected from those which are represented by the following general formula:

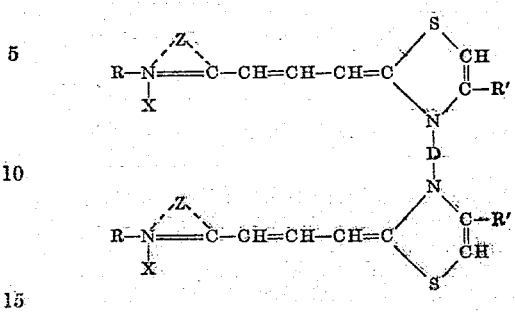

wherein R represents a primary alkyl group of the formula $C_nH_{2n+1}$ wherein $n$ represents a positive integer of from 1 to 4, R' represents a member selected from the group consisting of the methyl group and the phenyl group, X represents an anion, D represents a member selected from the group consisting of the ethylene, the trimethylene and the tetramethylene groups, and Z represents the non-metallic atoms necessary to complete a heterocyclic nucleus of the benzoxazole series.

3. A photographic gelatino-silver-bromoiodide emulsion sensitized with at least one sensitizing bis carbocyanine dye selected from those which are represented by the following general formula:

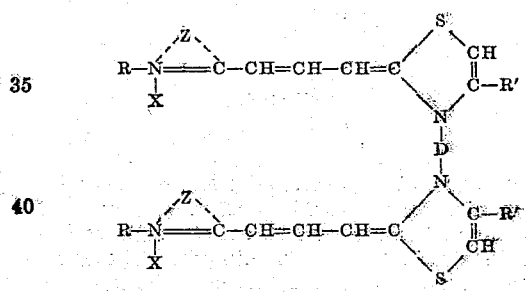

wherein R represents a primary alkyl group of the formula $C_nH_{2n+1}$ wherein $n$ represents a positive integer of from 1 to 4, R' represents a member selected from the group consisting of the methyl group and the phenyl group, X represents an anion, D represents a member selected from the group consisting of the ethylene, the trimethylene and the tetramethylene group, and Z represents the non-metallic atoms necessary to complete a heterocyclic nucleus of the benzoxazole series.

4. A photographic gelatino-silver-bromoiodide emulsion sensitized with the bis carbocyanine dye which is represented by the following formula:

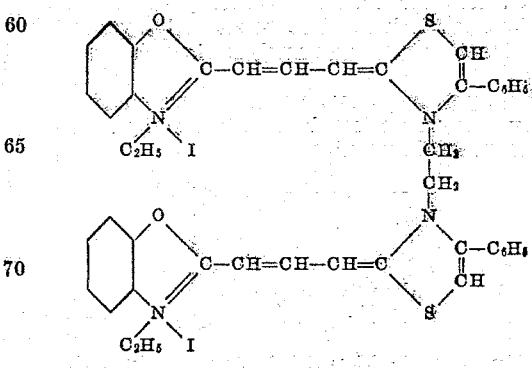

5. A photographic gelatino-silver-bromoiodide emulsion sensitized with the bis carbocyanine dye which is represented by the following formula:

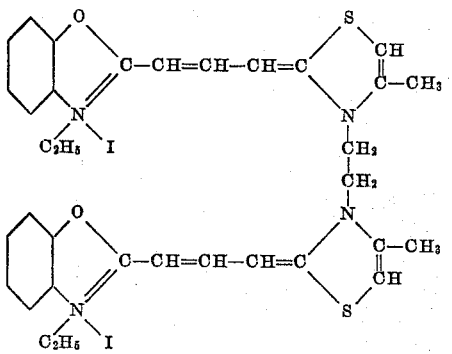

6. A photographic gelatino-silver-bromoiodide emulsion sensitized with the bis carbocyanine dye which is represented by the following formula:

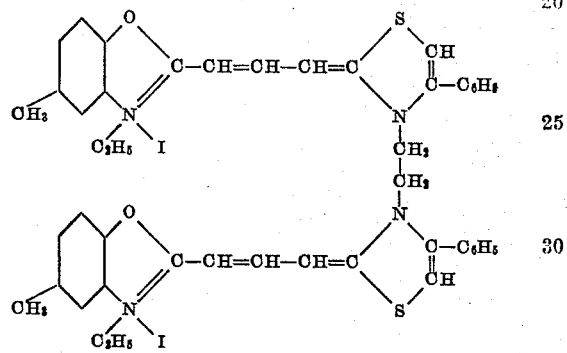

LESLIE G. S. BROOKER.

REFERENCES CITED

The following references are of record in the file of this patent:

UNITED STATES PATENTS

| Number | Name | Date |
|---|---|---|
| 1,969,445 | Brooker | Aug. 7, 1934 |
| 2,075,153 | Wilmanns | Mar. 30, 1937 |
| 2,166,736 | White et al. | July 18, 1939 |
| 2,170,804 | Brooker | Aug. 29, 1939 |
| 2,245,772 | Wilson | Aug. 19, 1947 |
| 2,245,773 | Wilson | Aug. 19, 1947 |
| 2,278,947 | Riester | Apr. 7, 1942 |
| 2,282,115 | Brooker et al. | May 5, 1942 |

OTHER REFERENCES

Chemical Abstracts 19:530; abstract of Proc. Roy. Soc. (London) 96 B. 317–333 (1924).

Chemical Abstracts 16:3101; abstract of Brit. Med. Journ., 1922 I 514–515.